INVENTOR.
Robert G. Kelly
BY
Herbert Furman
ATTORNEY

United States Patent Office 3,625,068
Patented Dec. 7, 1971

3,625,068
OMNIDIRECTIONAL SENSOR
Robert Garth Kelly, Franklin, Wis., assignor to General
Motors Corporation, Detroit, Mich.
Filed Aug. 31, 1970, Ser. No. 68,390
Int. Cl. G01p 15/02
U.S. Cl. 73—514                                        3 Claims

ABSTRACT OF THE DISCLOSURE

A support has a hollow tubular axial guide mounted on an end wall thereof. An operator is slidably mounted within the guide and spring biased in one axial direction toward actuated position. Balls mounted within openings in the wall of the guide engage a shoulder of the operator to hold the operator in normal position. The balls are held in engagement with the operator by a release member slidably mounted on the guide and spring biased in a direction opposite the direction of movement of the operator. An annular seismic mass surrounds the guide and includes an upper conical surface engageable by a like mating surface of the release member to thereby locate the seismic mass radially with respect to the guide. Additional centering springs between the mass and a cylindrical side wall of the support cooperate with the bias on the release member to additionally locate the mass. When the mass receives an acceleration pulse of predetermined amplitude and time, it will move radially of the guide, and the camming action of the mating surfaces on the mass and release member move the release member axially relative to the guide to release the balls and permit movement of the operator to actuated position.

---

This invention relates generally to omnidirectional sensors and more particularly to an omnidirectional sensor wherein the release means for the operator is movable axially thereof to released position by the engagement of cooperating conical surfaces on the release means and on a seismic mass movable radially of the release means upon being subjected to an acceleration pulse of predetermined amplitude and time.

One of the features of the sensor of this invention is that the release means for the operator is mounted on an axial guide for axial movement relative thereto and includes an axially directed conical surface engageable with a mating like surface of the seismic mass under an axially directed bias to thereby locate the release means axially with respect to the guide and also aid in locating the seismic mass radially with respect to the guide. Another feature of this invention is that the mass is additionally located radially with respect to the guide by opposing radially directed biases, with one or more of such biases and the axially directed bias providing a threshold bias which must be overcome by the acceleration pulse of predetermined amplitude and time before the mass can move radially of the guide. A further feature of this invention is that the conical surface of the seismic mass cams the release means axially of the guide when the mass moves radially of the guide to thereby effect the release of detent means holding the operator in a normal or unactuated position and permit movement of the operator to actuated position.

Figure 1:
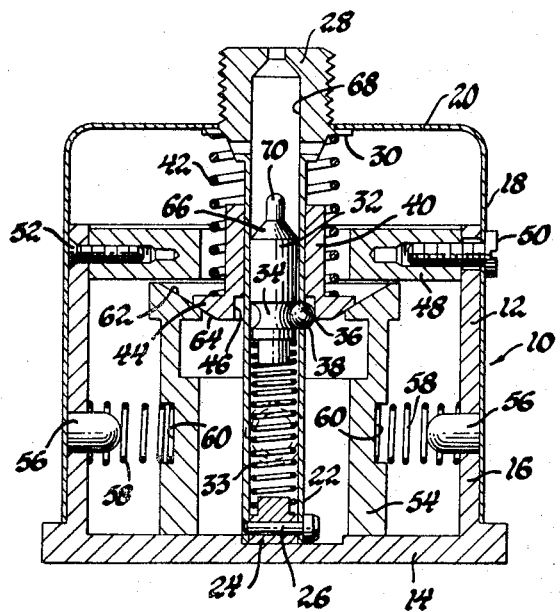
Figure 2:
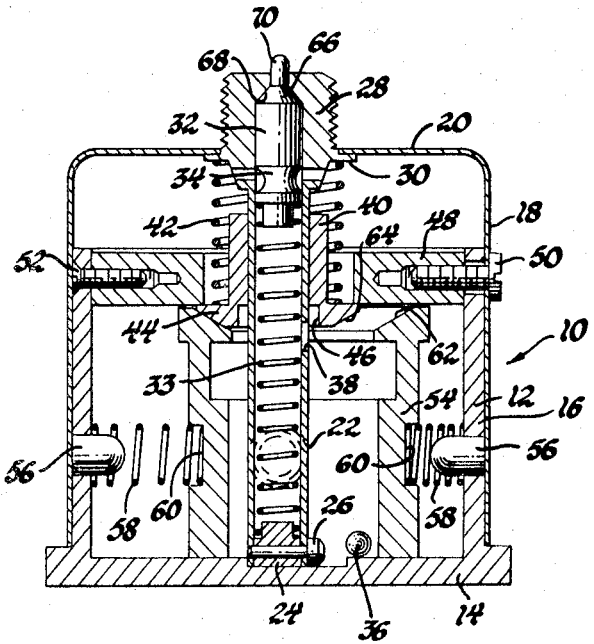

These and other features of the sensor of this invention will be readily apparent from the following specification and drawings wherein:

FIG. 1 is an axial sectional view of a sensor according to this invention, with the sensor being shown in normal or unactuated position; and FIG. 2 is a view similar to FIG. 1 showing the sensor in actuated position.

Referring now particularly to the drawings, a sensor designated 10 according to this invention, includes a housing 12 having a circular base plate or end wall 14 and a cylindrical side wall 16. A cylindrical cover 18 telescopes over the wall 12 and includes an apertured end wall 20. A cylindrical guide tube 22 has its lower end telescoped over a cylindrical boss 24 extending centrally of wall 14 and pinned thereto at 26. The upper end of the guide tube includes a threaded bushing 28 which projects outwardly of the aperture of wall 20 and has a radial flange 30 which seats against and is secured to wall 20 inwardly thereof. An operator 32 is slidably mounted within the guide 22 for movement between a normal or unactuated position shown in FIG. 1 and an actuated position shown in FIG. 2 under the bias of a spring 33 seating between the operator and boss 24. The operator includes a peripheral semi-cylindrical groove 34, and three balls 36 received within respective equally circumferentially spaced openings 38 in the guide 22 are engageable with the groove 34, as will be further described, to detent the operator 32 in its normal position.

A detent release member or sleeve 40 is slidably mounted on the exterior of the guide 22 and a coil spring 42 seating between flange 30 and a flange 44 of the sleeve 40 normally biases the sleeve downwardly of the guide 22, or opposite the direction of the movement of the operator 32. The sleeve 40 further includes an axially opening bore 46, the axial wall of which engages the balls 36 under the bias of spring 42 to normally hold the balls 36 in engagement with the groove 34 and thereby maintain the operator 32 in its normal position.

A cylindrical centrally apertured plate 48 fits within wall 16 and is bolted at 50 at a number of places to the wall 16 and the cover 18 and is also bolted at other places 52 only to the wall 16. The central aperture of the plate permits passage of the spring 42 and sleeve 40 therethrough, although flange 44 is of greater OD than the aperture and cannot pass therethrough. Plate 48 limits axial movement of sleeve 40 relative to guide 22 as will be further described.

A cylindrical seismic mass 54 has its lower end wall slidably mounted on the wall 14 of housing 12 and surrounds the guide 22. Four equally circumferentially spaced pins 56 project radially inwardly of wall 16, and each seats one end of a compression spring 58, the other end of which seats within a respective radial bore 60 in the seismic mass. Springs 58 are of generally equal strength and act to center the seismic mass radially of wall 16 and guide 22. The upper end of the mass includes a radially and axially tapered surface or conical wall 62 which is engaged by a like shaped mating surface or wall 64 of flange 44 under the action of the spring 42 when the mass is in its position shown in FIG. 1. The axial force of the spring 42 in combination with walls 62 and 64, and the radial force of one or more of the springs 58 provide a threshold force acting to normally maintain the mass 54 in its position shown in FIG. 1 against movement radially of the guide 22. This threshold force must be overcome before movement of the mass 54 through a predetermined distance can occur. The engagement of walls 62 and 64 also acts to locate sleeve 40 axially of guide 22 and thereby locate the axial wall of bore 46 with respect to balls 36.

When the mass 54 is subject to an acceleration pulse of predetermined amplitude and time, such pulse being directed generally radially of the guide 22, the mass 54 will shift radially of the guide from its FIG. 1 position to its FIG. 2 position. As the mass shifts radially of the guide, the camming action of the wall 62 on the wall 60 will cam the sleeve 40 upwardly along the guide 22. This moves the axial wall of bore 46 out of radial opposition to the balls 36 and permits spring 33 to cam the balls 36 outwardly of oepnings 38 and thereby release the operator 32 for movement from its FIG. 1 position to its position shown in FIG. 2. The operator 32 is maintained in its FIG. 2 position against any further axial movement by the engagement of a radially and axially tapered wall 66 thereof with a like-shaped wall of the bore 68 of bushing 28. The firing pin 70 of the operator projects outwardly of the bushing and may actuate a detonator or rupture a diaphragm or perform any other desired function. The engagement of flange 44 with plate 48, as shown in FIG. 2, limits axial movement of sleeve 40 relative to guide 22 and also limits radial movement of mass 54 with respect to guide 22. When the acceleration pulse decreases below the required amplitude, mass 54 and sleeve 40 return to their position shown in FIG. 1, although operator 32 remains in its actuated position shown in FIG. 2.

The sensor 10 of this invention has particular usefulness in an air cushion restraint system for a vehicle. Such a system includes a pressure vessel sealed by a diaphragm and communicating with manifold and diffuser ducts to inflate a cushion in the event of vehicle impacts of a particular magnitude. The sensor 10 may be mounted at a predetermined location on the vehicle to sense such impacts and if the impact is of sufficient magnitude, a pulse of the required amplitude and time will be applied to the mass 54 to release the operator 32 for movement to its actuated position. As previously mentioned, the firing pin 70 of the operator may directly rupture the diaphragm of the pressure vessel, actuate a detonator to rupture such diaphragm, or close a circuit to electrically fire a squib or other means for rupturing the diaphragm.

Thus this invention provides an improved omnidirectional sensor.

What is claimed is:

1. An omnidirectional sensor comprising, a support including an axial guide, an operator mounted on the guide for axial movement relative thereto between normal and actuated positions means biasing the operator to the actuated position, detent means engageable with the operator to hold the operator in normal position, detent release means mounted on the guide for axial movement into and out of engagement with the detent means to selectively and alternately hold the detent means in engagement with the operator or release the detent means form engagement therewith, means biasing the release means into engagement with the detent means, an annular seismic mass surrounding the guide, means acting to locate the mass radially of the guide, and radially and axially directed mating surfaces on the mass and detent release means engageable under the action of the biasing means to aid in locating the mass radially of the guide and to locate the release means in a predetermined axial position in engagement with the detent means, an acceleration pulse of predetermined amplitude and time moving the seismic mass radially with respect to the guide against the action of the locating and biasing means, the mating surfaces moving the release means axially out of engagement with the detent means upon movement of the seismic mass radially relative to the guide.

2. An omnidirectional sensor comprising, a support including an axial guide, an operator mounted on the guide for axial movement relative thereto between normal and actuated positions means biasing the operator to the actuated position, detent means engageable with the operator to hold the operator in normal position, detent release means mounted on the guide for movement axially thereof into and out of engagement with the detent means to selectively and alternately hold the detent means in engagement with the operator or release the detent means from engagement therewith, means biasing the release means axially opposite the direction of movement of the operator into engagement with the detent means, an annular seismic mass slidably mounted on the support and circumferentially surrounding the guide, means acting to locate the mass radially of the guide, and mating conical surfaces on the mass and detent release means engageable under the action of the biasing means to aid in locating the mass radially of the guide and to locate the release means in a predetermined axial position with respect to the guide in engagement with the detent means, an acceleration pulse of predetermined amplitude and time moving the seismic mass radially with respect to the guide against the action of the locating and biasing means, the mating conical surfaces moving the release means axially out of engagement with the detent means upon movement of the seismic mass radially relative to the guide.

3. An omnidirectional sensor comprising, a support including an axial guide, an operator mounted on the guide for axial movement relative thereto between normal and actuated positions means biasing the operator to the actuated position, detent means engageable with the operator to hold the operator in normal position, detent release means mounted on the guide for axial movement into and out of engagement with the detent means to selectively and alternately hold the detent means in engagement with the operator or release the detent means from engagement therewith, means biasing the release means into engagement with the detent means, a generally cylindrical seismic mass circumferentially surrounding the guide and having one end wall thereof slidably mounted on the support, opposed radial biasing means acting to locate the mass radially of the guide, axially directed mating conical surfaces on the other end wall of the mass and on the detent release means engageable under the action of the release means bias to aid in locating the mass radially of the guide and to locate the release means in a predetermined axial position with respect to the guide in engagement with the detent means, an acceleration pulse of predetermined amplitude and time moving the seismic mass radially with respect to the guide against the action of the biasing means, the mating conical surfaces moving the release means axially out of engagement with the detent means upon movement of the seismic mass radially relative to the guide.

No references cited.

RICHARD C. QUEISSER, Primary Examiner

H. GOLDSTEIN, Assistant Examiner

UNITED STATES PATENT OFFICE
CERTIFICATE OF CORRECTION

Patent No. 3,625,068  Dated December 7, 1971

Inventor(s) Robert G. Kelly

It is certified that error appears in the above-identified patent and that said Letters Patent are hereby corrected as shown below:

Column 3, line 5, "oepnings" should read -- openings --.
line 42, after "positions" insert a comma (,).
line 48, "form" should read -- from --.

Column 4, line 6, after "positions" insert a comma (,).
line 33, after "positions" insert a comma (,).

Signed and sealed this 30th day of May 1972.

(SEAL)
Attest:

EDWARD M. FLETCHER, JR.
Attesting Officer

ROBERT GOTTSCHALK
Commissioner of Patents